(12) United States Patent
Henzler

(10) Patent No.: US 10,682,708 B2
(45) Date of Patent: Jun. 16, 2020

(54) CARRIER TOOL, CUTTING INSERT, AND CLAMPING ELEMENT

(71) Applicant: CeramTec GmbH, Plochingen (DE)

(72) Inventor: Uwe Henzler, Hochdorf (DE)

(73) Assignee: CERAMTEC GMBH, Plochingen (DE)

( * ) Notice: Subject to any disclaimer, the term of this patent is extended or adjusted under 35 U.S.C. 154(b) by 99 days.

(21) Appl. No.: 15/542,327

(22) PCT Filed: Jan. 11, 2016

(86) PCT No.: PCT/EP2016/050366
§ 371 (c)(1),
(2) Date: Jul. 11, 2018

(87) PCT Pub. No.: WO2016/110596
PCT Pub. Date: Jul. 14, 2016

(65) Prior Publication Data
US 2019/0001419 A1     Jan. 3, 2019

(30) Foreign Application Priority Data

Jan. 9, 2015   (DE) .................. 10 2015 000 055
Aug. 18, 2015  (DE) .................. 10 2015 010 620

(51) Int. Cl.
*B23B 27/16*     (2006.01)
*B23C 5/22*      (2006.01)

(52) U.S. Cl.
CPC ...... *B23B 27/1625* (2013.01); *B23B 27/1614* (2013.01); *B23B 2200/086* (2013.01); *B23B 2200/088* (2013.01)

(58) Field of Classification Search
CPC ........ B23B 2200/086; B23B 2200/088; B23B 27/1614
See application file for complete search history.

(56) References Cited

U.S. PATENT DOCUMENTS 4,477,212 A * 10/1984 Kraft .................. B23B 27/1651
                                                407/104
5,820,311 A * 10/1998 Grun .................. B23B 27/1677
                                                407/102

(Continued)

FOREIGN PATENT DOCUMENTS

DE      198 54 873 A1    5/2000
DE        19854873 A1 *  5/2000   ......... B23B 27/1625

(Continued)

OTHER PUBLICATIONS

International Search Report for PCT/EP2016/050366 dated Apr. 26, 2016; English translation submitted herewith (8 pages).

(Continued)

*Primary Examiner* — Sara Addisu
(74) *Attorney, Agent, or Firm* — Fitch, Even, Tabin & Flannery, LLP

(57) ABSTRACT

The invention relates to a carrier tool (1) comprising a clamping element (2) with a clamping element projection (3) and comprising a cutting insert (4) with a clamping recess (5) on the cutting insert surface (13) for machining workpieces. The clamping recess (5) has an annular indentation (9) with a recess base (7), and the indentation (9) transitions from the recess base (7) into the cutting insert surface (13) via an annular surface (8). The indentation (9) surrounds an elevation (10), the tip (11) of which lies above the recess base (7) and below the cutting insert surface (13). The clamping element projection (3) engages into the clamping recess (5) and thus clamps same on the carrier tool (1). In order to allow a pre-centering of the contour of the clamping element projection (3) and the contour of the clamping recess (5) when closing the clamping element (2), the contours of the clamping element projection and the clamping recess thus engaging into each other in a form-fitting and precisely positioned manner, the clamping element projec- (Continued)

tion (3) has an annular contour (12) which surrounds the elevation (10) in the clamped state but does not contact the elevation and rests solely on the annular surface (8).

6 Claims, 6 Drawing Sheets

(56) References Cited

U.S. PATENT DOCUMENTS

| | | | | |
|---|---|---|---|---|
| 6,017,172 | A * | 1/2000 | Ukegawa | B23B 27/1651 407/113 |
| 6,379,087 | B1 * | 4/2002 | Alexander, IV | B23B 27/1651 407/105 |
| 7,195,427 | B2 * | 3/2007 | Sjoo | B23B 27/1651 407/111 |
| 8,657,539 | B2 * | 2/2014 | Morrison | B23C 5/2221 407/113 |
| 9,486,857 | B2 * | 11/2016 | Stemmer | B23B 27/141 |
| 9,511,421 | B2 * | 12/2016 | Chen | B23B 27/1677 |
| 2003/0086766 | A1 | 5/2003 | Andras | |
| 2003/0219319 | A1 * | 11/2003 | Arvidsson | B23B 27/12 407/40 |
| 2004/0256608 | A1 | 12/2004 | Eder et al. | |
| 2005/0186039 | A1 * | 8/2005 | Muller | B23B 27/164 407/113 |
| 2010/0266354 | A1 | 10/2010 | Zitzlaff et al. | |
| 2013/0051941 | A1 * | 2/2013 | Ben Amor | B23B 27/164 407/64 |
| 2013/0129438 | A1 * | 5/2013 | Ben Amor | B23B 27/1651 407/109 |
| 2014/0234041 | A1 | 8/2014 | Ben Amor | |
| 2014/0294520 | A1 * | 10/2014 | Henzler | B23B 27/1625 407/11 |
| 2015/0343534 | A1 * | 12/2015 | Kaufmann | B23B 27/045 407/11 |
| 2016/0016233 | A1 * | 1/2016 | Sanjeevasetty | B23B 27/164 407/107 |
| 2017/0165757 | A1 * | 6/2017 | Goldsmith | B23B 27/145 |
| 2017/0341154 | A1 * | 11/2017 | Kiemele | B23B 27/145 |
| 2020/0030888 | A1 * | 1/2020 | Henzler | B23B 27/1625 |

FOREIGN PATENT DOCUMENTS

| | | | | |
|---|---|---|---|---|
| DE | 10 2005 011955 | A1 | 12/2005 | |
| EP | 0389788 | A2 | 10/1990 | |
| JP | 60114404 | A * | 6/1985 | B23B 27/1677 |
| JP | 11077408 | A * | 3/1999 | B23B 27/1651 |
| JP | 2006167874 | A * | 6/2006 | B23B 27/04 |
| WO | 03/013770 | A1 | 2/2003 | |
| WO | 2008/155331 | A1 | 12/2008 | |
| WO | 2012/017031 | A1 | 2/2012 | |
| WO | 2013/050520 | A1 | 4/2013 | |

OTHER PUBLICATIONS

Office Action and Search Report of CN Appln. No. 201680005317.1 dated Aug. 30, 2018 with English translation.

Office action in counterpart EP Appln. 16 700 409.2-1019 dated Dec. 13, 2019.

* cited by examiner

CARRIER TOOL, CUTTING INSERT, AND CLAMPING ELEMENT

CROSS-REFERENCE TO RELATED APPLICATIONS

This application is a U.S. national phase application filed under 35 U.S.C. § 371 of International Application No. PCT/EP2016/050366, filed Jan. 11, 2016, designating the United States, which claims priority from German Patent Application No. 10 2015 000 055.1, filed Jan. 9, 2015, and German Patent Application No. 10 2015 010 620.1, filed Aug. 18, 2015, which are hereby incorporated herein by reference in their entirety.

BACKGROUND OF THE INVENTION

The present invention refers to a carrier tool comprising a clamping element with a clamping element projection and comprising a cutting insert with a clamping recess on the cutting insert surface for machining workpieces, wherein the clamping recess has an annular indentation with a recess base, the indentation transitions from the recess base into the cutting insert surface via an annular surface and the indentation surrounds an elevation, the tip of which lies above the recess base and below the cutting insert surface, and the clamping element projection engages into the clamping recess and thus clamps same on the carrier tool.

A carrier tool of this kind is described in DE 198 54 873 A1. While clamping the cutting insert on the carrier tool, the clamping element projection pushes on the side of the elevation in a way such that the cutting insert is pulled into the cutting insert seat. A point contact essentially takes place between the clamping element projection and the elevation. The clamping claw exerts, in the clamped condition, a retraction force upon the cutting insert, whereby the insert is reliably pulled into and fixed in the insert seat of the cutting tool.

SUMMARY OF THE INVENTION

The object of the invention is to develop a carrier tool comprising a clamping element with a clamping element projection and comprising a cutting insert with a clamping recess on the cutting insert surface, for machining workpieces, wherein the clamping recess has an annular indentation with a recess base, the indentation transitions from the recess base into the cutting insert surface via an annular surface and the indentation surrounds an elevation, the tip of which lies above the recess base and below the cutting insert surface and the clamping element projection engages into the clamping recess and thus clamps the same on the carrier tool, so that by closing the clamping element, the contour of the clamping element projection and the contour of the recess are pre-centered, thus engaging into each other in a form-fitting and precisely positioned manner.

This object is achieved, according to the invention, in that the clamping element projection has an annular contour, which surrounds the elevation in the clamped state but does not contact the elevation and rests solely on the annular surface. During clamping of cutting insert on the carrier tool, the annular contour exclusively contacts the elevation but does not contact the annular surface. Thus, when closing the clamping element, the contour of the clamping element projection and the contour of the recess are pre-centered so that the clamping element projection and the annular contour may form-fittingly abut or engage into each other.

The annular surface is preferably a cone, a 3-centered arc depression or a domed shape. In this way, the horizontal acting retraction force and the vertical pushing force are introduced into the cutting insert so that even fragile ceramic materials may be reliably clamped. The recess reduces to a minimum the risk of cracking or fracturing a ceramic cutting insert.

An embodiment of the invention is characterized in that the annular surface is formed as an annular conical surface, that the elevation from the recess base to the tip is formed as a centering cone and the annular contour on the clamping element projection is formed as a clamping element centering cone, wherein the angle of the centering cone and of the clamping element centering cone with respect to the cutting insert surface are both greater than the angle of the annular conical surface with respect to the cutting insert surface.

A cutting insert according to the invention is preferably characterized in that the annular surface is formed as an annular conical surface, that the elevation from the recess base to the tip is formed as a centering cone, and the angle of the annular conical surface with respect to the cutting insert surface is smaller than the angle of the centering cone on the elevation with respect to the cutting insert surface.

The cutting insert is preferably an indexable cutting insert and is comprised of ceramics or CBN. Hard metals or similar materials may also be used. CBN is characterized by its extreme hardness.

A cutting insert according to the invention for mounting in carrier tools for machining of workpieces, with a circular clamping recess which is disposed on the cutting insert surface, wherein the cutting recess has an annular indentation with a recess base, the recess base transitions via an annular surface into the cutting insert surface and the annular indentation surrounds an elevation, the tip of which lies above the recess base and below the cutting insert surface, is characterized in that the annular surface is a cone, a 3-centered arc depression or has a domed shape.

A clamping element according to the invention with a clamping element projection for engaging with a clamping recess of a cutting insert is characterized in that the clamping element projection has an annular contour with an inwardly directed clamping element centering cone.

The main application field of the described recess is in replaceable indexable cutting inserts made of ceramics or CBN. The recess is used for engaging a clamping element projection of a clamping element or clamping claw or clamping finger. The clamping element in the clamped condition, exerts a retraction force on the indexable cutting insert, which is therefore reliably fixed in the insert seat of the carrier tool.

The centering cone ensures that during closing of the clamping element, the contour of the clamping element projection and the contour of the elevation in the indexable cutting insert are pre-centered and therefore abut against each other with a form fit and in a precisely positioned manner.

BRIEF DESCRIPTION OF THE DRAWINGS

The invention is explained in the following by means of the corresponding figures, in which.

DETAILED DESCRIPTION OF THE INVENTION

Figure 1:
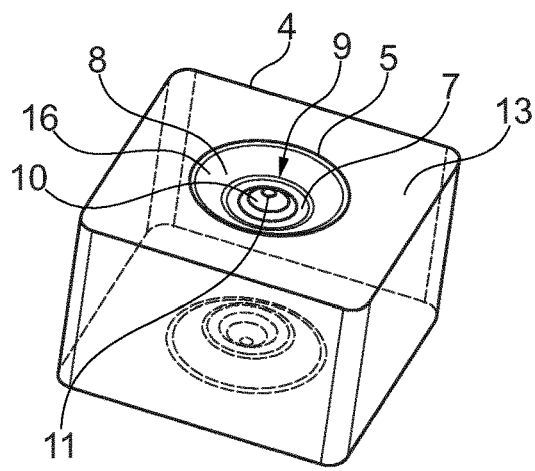
FIGS. 1, and 2 show a cutting insert according to the invention.
Figure 2:
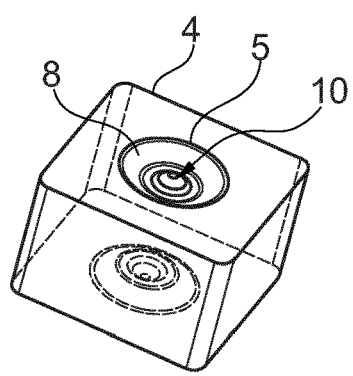
Figure 13:
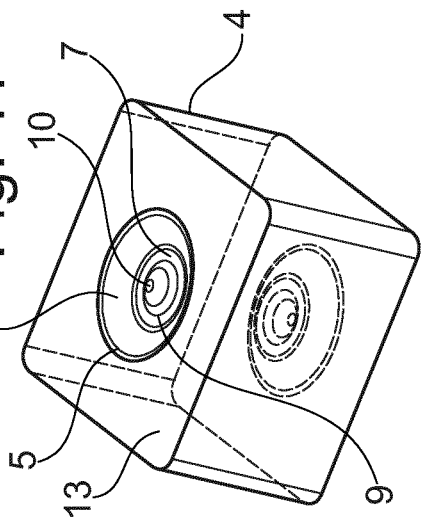
FIG. 13 shows a cutting insert according to the invention.

FIGS. 1, 2 and 13 show a cutting insert 4 according to the invention, which is provided, on the cutting insert surface 13, with a clamping recess 5. When, in the following, reference is made to a cutting insert, it is always meant to be an indexable cutting insert, which is also provided on its lower side with a clamping recess 5. The clamping recess 5 has a circular form and has a recess base 7, which transitions via an annular surface 8 into the cutting insert surface 13. At the center of the clamping recess 5 an elevation 10 is formed, which in the following is also indicated as a centering cone, the tip 11 of which is positioned below the cutting insert surface 13 and above the recess base 7.

Figure 6:
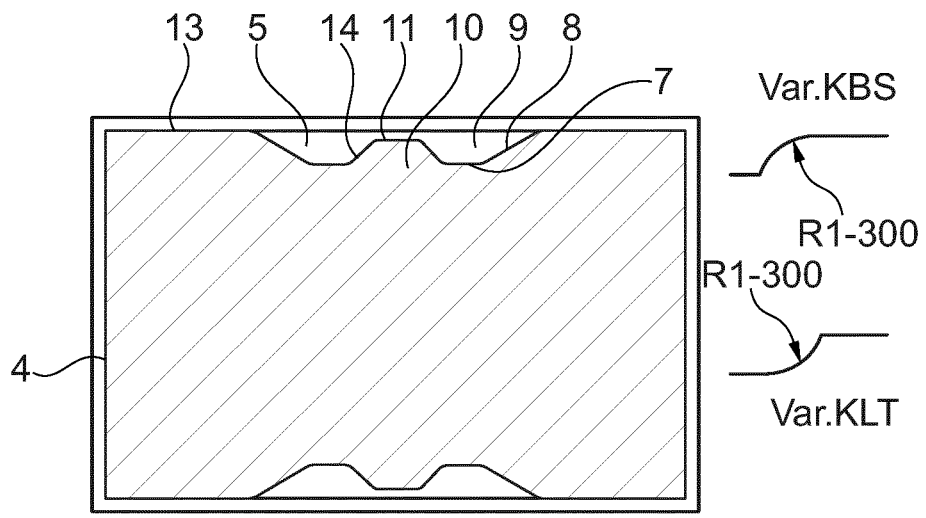
FIG. 6 shows the cutting insert in a cross section.

FIG. 6 shows said cutting insert 4 in a cross section. In all variants, the recess base 7 transitions via an annular surface 8 into the cutting insert surface 13. In all figures, this annular surface 8 has a conical form or forms an annular conical surface. This is a preferred embodiment. In FIG. 6, on the right side, besides the cutting insert 4, two other embodiments of the annular surface 8 are shown, since it also may be provided in the form of a 3-centered arc depression or with a domed shape. FIG. 6 clearly shows the elevation 10, which is positioned at the center of the clamping recess 5, and which is surrounded by an annular indentation 9.

The elevation 10 preferably extends from the recess base 7 with a centering cone to the tip 11. The angles of the annular conical surface and of the centering cone are very important. This is explained in the following.

Figure 3:
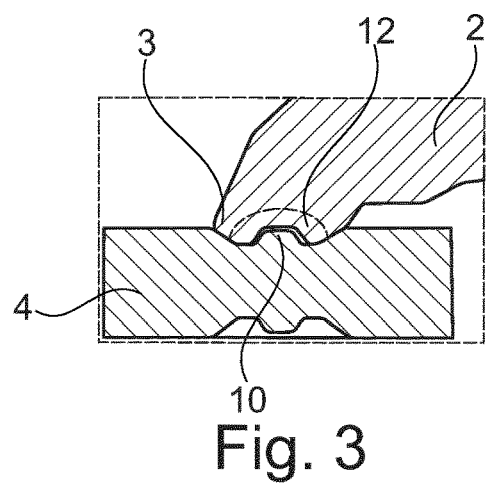
FIG. 3 shows a section of a carrier tool.

FIG. 3 shows a section of a carrier tool. A clamping element 2 with a clamping element projection 3 is shown. The clamping element projection 3 engages into the clamping recess 5 of a cutting insert 4 and therefore clamps the latter onto the carrier tool 1. The clamping element projection 3 has an annular contour 12, which surrounds, in the clamped condition, the elevation 10, but without contacting the same and resting solely on the annular surface 8.

Figure 4:
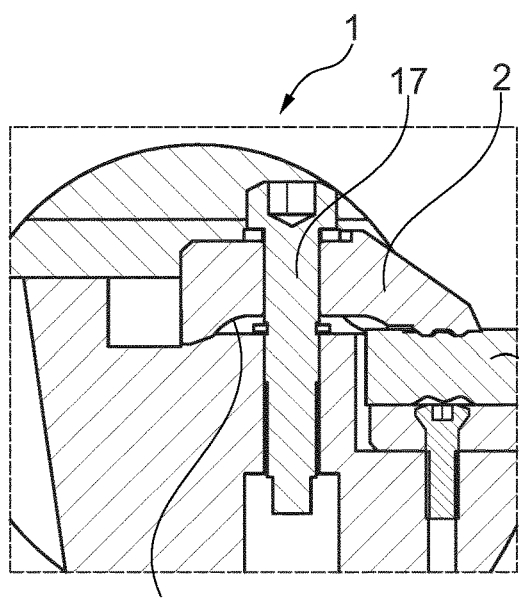
FIG. 4 shows the carrier tool with a clamping element.

FIG. 4 shows the carrier tool with a clamping element 2, which is fixed to the carrier tool 1 by means of a screw 17. The clamping element 2 is provided, on the end which is opposed to the cutting insert 4, with a bevel 18, which rests on an identical bevel 19 on the carrier tool 1. During the fixing process, i.e. during rotation of the screw 17, the bevel 18 on the clamping element 2 slides downwards over the bevel 19 on the carrier tool and therefore pulls the cutting insert 4 into its seat. FIG. 3 shows the clamped condition, in which the annular contour 3 on the clamping element 2 only contacts the annular surface 8.

Figure 5:
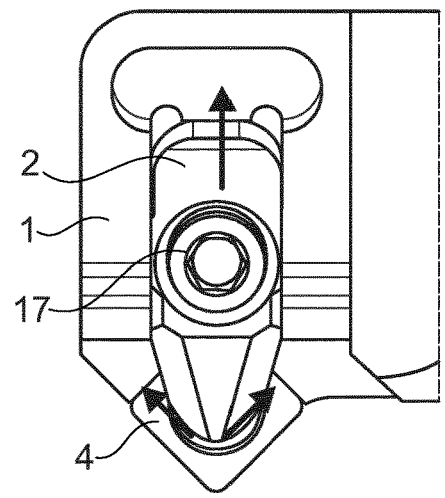
FIG. 5 shows the carrier tool in a view from above on the clamping element.

FIG. 5 shows the carrier tool 1 in a view from above on the clamping element, which is currently machining a cutting insert 4. Arrows indicate the pulling forces. The lateral guide of the clamping element 2 on the guide surfaces in the carrier tool 1 are clearly visible.

Figure 7:
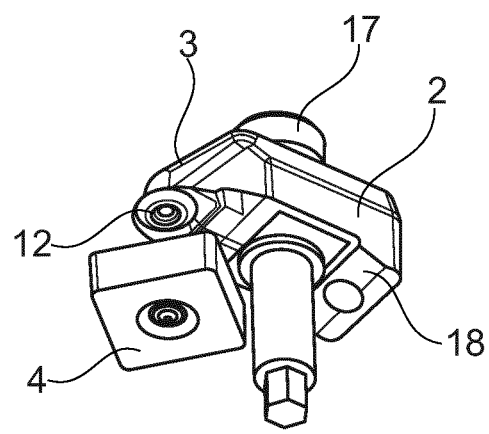
FIG. 7 shows a clamping element with an inserted screw and a cutting insert from below.

FIG. 7 shows a clamping element 2 with an inserted screw 17 and a cutting insert 4 from below. The bevel 18 or retraction bevel on the clamping element 2 is clearly shown. The clamping element 2 has an annular contour 3 on the clamping element projection 3. This is explained in the following.

Figure 8:
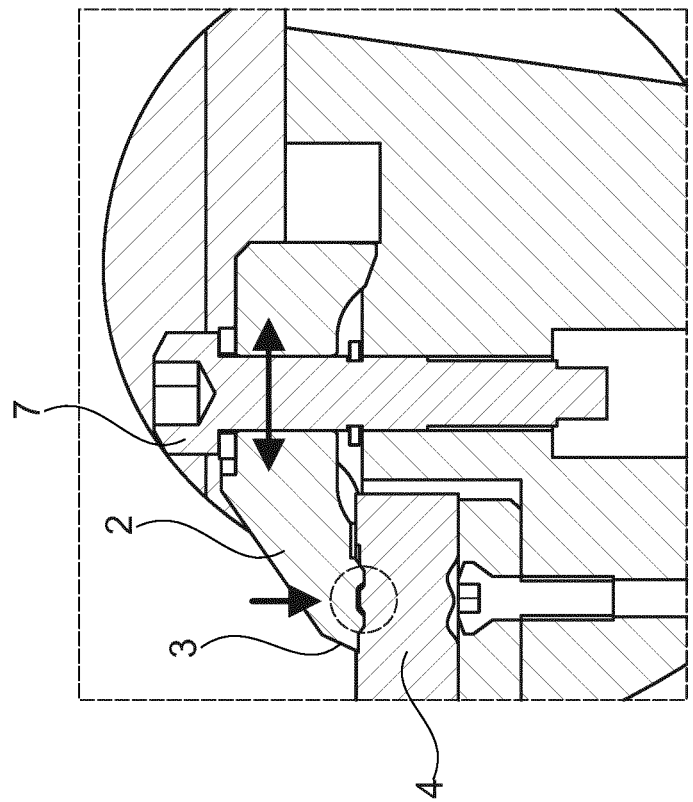
FIG. 8 shows a section of a clamping element with an inserted screw and a cutting insert before assembling.

FIG. 8 shows a section of a clamping element 2 with an inserted screw 17 and a cutting insert 4 before assembling. The screw 17 is inserted with a clearance in the clamping element 2, in order for the clamping element 2 to be movable, during clamping, by means of bevels, in the clamping direction, i.e. away from the cutting insert 4.

Figure 9:
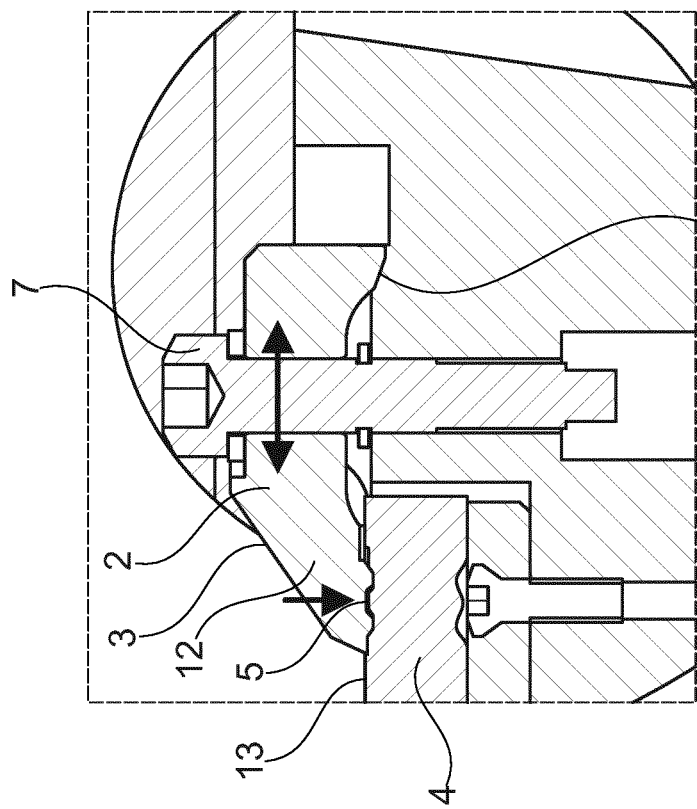
FIG. 9 shows a section of a clamping element with an inserted screw and a cutting insert before assembling, i.e. in the clamped condition.

FIG. 9 shows a section of a clamping element 2 with an inserted screw 17 and a cutting insert 4 before assembling, i.e. in the clamped condition. The clamping element projection 3 engages into the clamping recess 5 and the clamping element has slipped backwards over the bevel and has pulled the cutting insert 4 into its seat.

Figure 11:
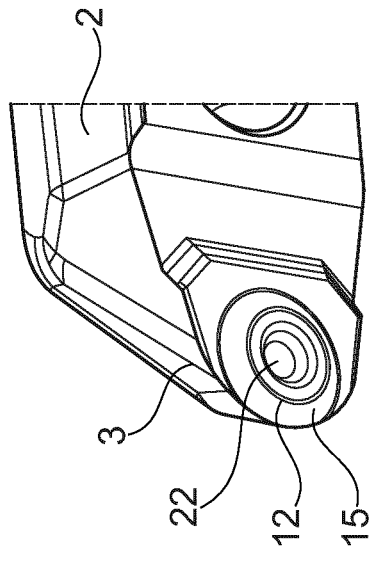
FIGS. 10 and 11 show the clamping element from below.
Figure 10:
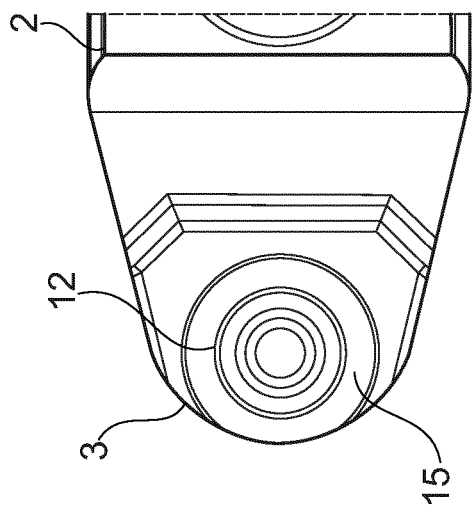

FIGS. 10 and 11 show the clamping element 2 from below. On the front end of the clamping element 2 the clamping element projection 3 with its annular contour 12 and the centering recess 2 is provided. The annular surface 21 of contour 12 is preferably conical. The contour 12 engages, in the clamped condition, into the clamping recess and surrounds the elevation, without contacting the elevation in the clamped state, but only during clamping.

Figure 12:
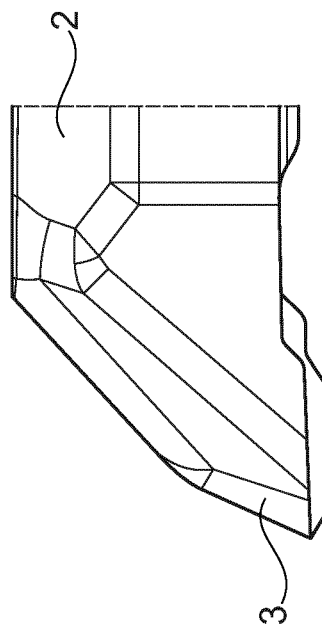
FIG. 12 shows the clamping element in section.

FIG. 12 shows the clamping element 2 in a section. The annular contour 12, which is protruding in the direction of the cutting insert 4 is shown.

FIG. 13 has already been previously described.

Figure 14:
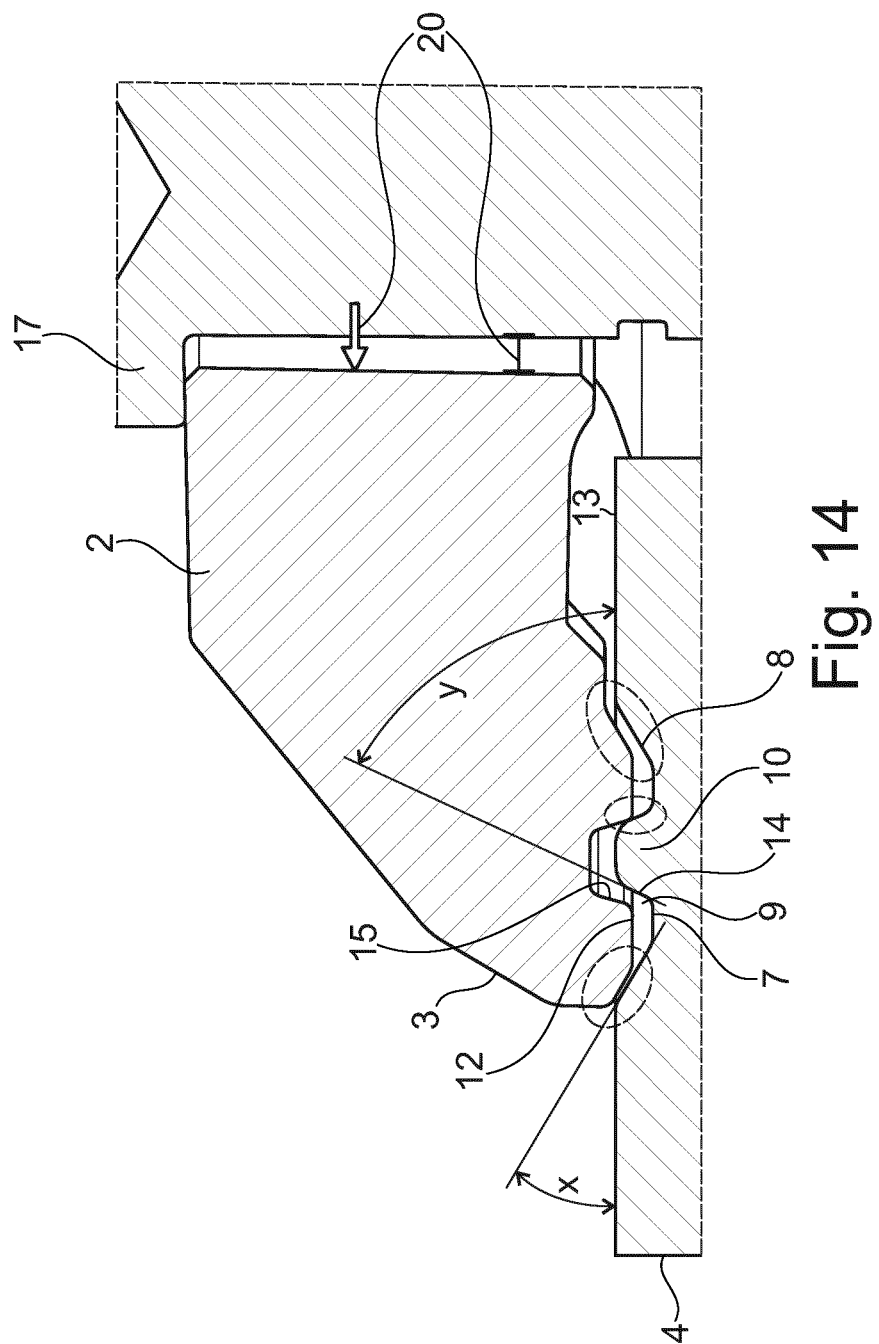
FIG. 14 shows a detail of the clamping element with an inserted screw.

FIG. 14 shows a detail of the clamping element 2 with an inserted screw 17, which is also called a clamping screw, during clamping, i.e. insertion of the annular contour 12 on clamping element projection 3 into the clamping recess 5. FIG. 14 shows the insertion when the clamping element 2 is in the forward end position, i.e. when the maximum clearance 20 has been reached. This figure also shows that during clamping, i.e. insertion, the annular contour 12 only contacts the elevation, without contacting the annular surface 8.

In this preferred embodiment, the annular surface 8 is provided as an annular conical surface 16. The elevation 10 is formed from the recess base 7 up to the tip by a centering cone 1) and the annular contour 12 on the clamping element projection 3 is provided as a clamping element centering cone 15, wherein the angle Y of the centering cone 14 and of the clamping element centering cone 15 X with respect to the cutting insert surface 13 are both greater than the angle of the annular conical surface X with respect to cutting insert surface 13. The angle X of the annular conical surface with respect to the cutting insert surface 13 is preferably lower than 30 degrees in all embodiments.

Figure 15:
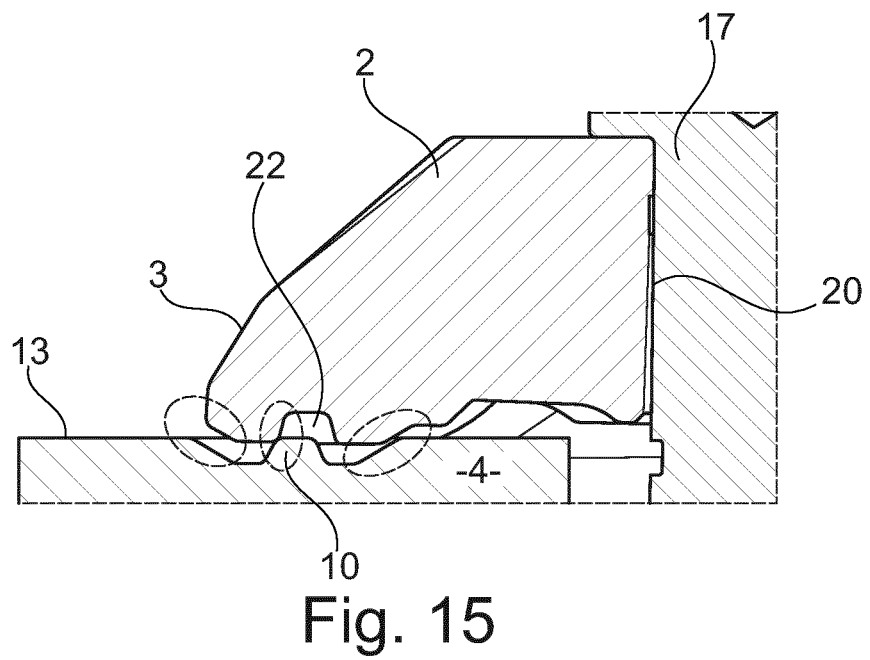
FIG. 15 shows a detail of the clamping element with an inserted screw during clamping.

FIG. 15 shows, like FIG. 14, a detail of the clamping element 2 with an inserted screw 17, which is also called a clamping screw, during clamping, i.e. during insertion of the annular contour 12 on the clamping element projection 3 into the clamping recess 5. FIG. 15 shows the insertion, when the clamping element 2 is in the rearward end position, i.e. when the minimum clearance 20 has been reached, i.e. when the clamping element 2 abuts against the screw 17. Also in this figure, it is shown that during clamping, i.e.

insertion, the annular contour 12 only contacts the elevation without contacting the annular surface 8.

Figure 16:
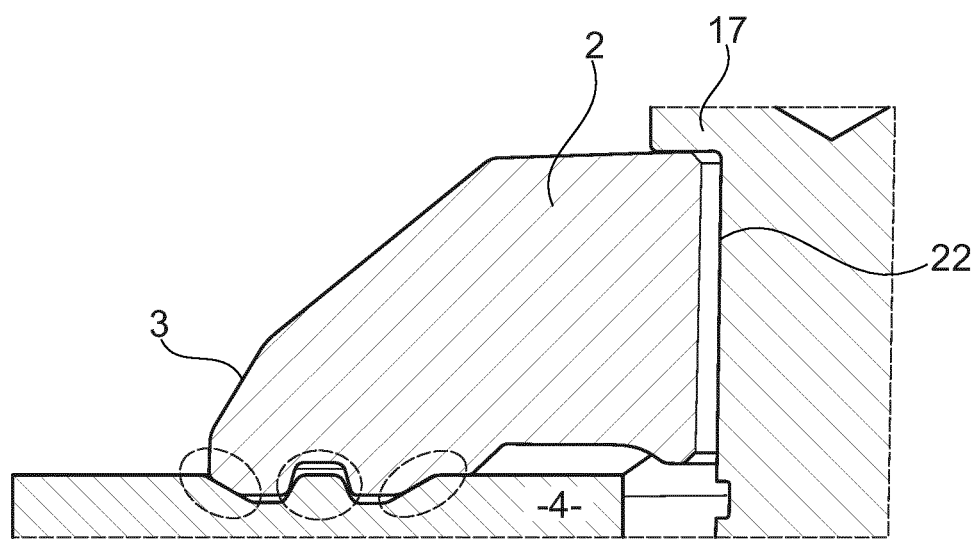
FIG. 16 shows a detail of the clamping element with an inserted screw and the cutting insert in the clamped condition.

FIG. 16 shows a detail of the clamping element 2 with an inserted screw 17 and the cutting insert 4 in the clamped condition. The annular contour 12 on the clamping element projection 3 only contacts the annular surface 8 without contacting the elevation 10. The centering recess and the centering cone do not contact each other.

The high process reliability is obtained, besides by the lateral guide (see FIG. 5), mainly by the retraction of the clamping element by means of the retraction bevel (see FIG. 4), the form fitting between the clamping element contour and the cutting insert as well as the pushing of the clamping element projection into the clamping recess. Due to these circumstances, it is ensured that the cutting insert is non-rotatably pulled into the insert seat.

Field of Application

The form of the recess of the clamping element is adapted in order to precisely fit into the recess form of a replaceable indexable cutting insert made of ceramics or CBN, hard metals or similar materials. The clamping claw exerts, in the clamped condition, a retraction force, upon the indexable cutting insert, which is therefore reliably fixed in the insert seat of the cutting tool. For reliably positioning the clamping element in the WSP (indexable cutting insert) during the clamping process, the centering recess in the clamping element is used, which engages the centering cone in the WSP.

A characteristic of the recess is the centering cone, which has the function to ensure that during closing of the clamping element, the contour of the clamping element and the contour of the indexable cutting insert are pre-centered and thus engage into each other in a form-fitting and precisely positioned manner.

The invention claimed is:

1. A carrier tool comprising a clamping element with a clamping element projection and comprising a cutting insert with a clamping recess on the cutting insert surface, for machining workpieces, wherein the clamping recess has an annular indentation with a recess base, the indentation transitions from the recess base into the cutting insert surface via an annular surface and the indentation surrounds an elevation, the tip of which lies above the recess base and below the cutting insert surface and the clamping element projection engages into the clamping recess and thus clamps the same on the carrier tool, wherein the clamping element projection has an annular contour which, in the clamped state, surrounds the elevation but does not contact the elevation and rests solely on the annular surface at at least two portions 180° apart, and, during clamping of the clamping insert on the carrier tool before reaching the clamped state, the annular contour solely contacts the elevation without contacting the annular surface.

2. The carrier tool of claim 1, wherein the annular surface is provided as a cone.

3. The carrier tool of claim 1, wherein the annular surface is provided as an annular conical surface, that the elevation extends from the recess base to the tip of the centering cone and the annular contour on the clamping element projection is provided as a clamping element centering cone, wherein the angle of the centering cone and of the clamping element centering cone with respect to the cutting insert surface are both greater than the angle of the annular conical surface with respect to the cutting insert surface.

4. The carrier tool of claim 1, wherein the cutting insert is made of ceramics, CBN or a hard metal.

5. The carrier tool of claim 1, wherein the annular surface is provided as a 3-centered arc depression.

6. The carrier tool of claim 1, wherein the annular surface is provided with a domed shape.

* * * * *